United States Patent [19]

Nakanowatari et al.

[11] Patent Number: 4,711,530
[45] Date of Patent: Dec. 8, 1987

[54] LIQUID CRYSTAL DEVICE HAVING BIREFRINGENT PLATE NEXT TO POLARIZER

[75] Inventors: Jun Nakanowatari, Miyagi; Mitsuru Kano, Furukawa, both of Japan

[73] Assignee: Alps Electric Co., Ltd., Japan

[21] Appl. No.: 911,236

[22] Filed: Sep. 24, 1986

[30] Foreign Application Priority Data

Sep. 27, 1985 [JP] Japan ................... 60-214241

[51] Int. Cl.⁴ .............................................. G02F 1/13
[52] U.S. Cl. ............................ 350/339 R; 350/350 S
[58] Field of Search ...................... 350/339 R, 350 S

[56] References Cited

U.S. PATENT DOCUMENTS

| | | | |
|---|---|---|---|
| 4,388,375 | 1/1983 | Hopper et al. | 350/339 R X |
| 4,492,433 | 1/1985 | Imaya et al. | 350/339 R |
| 4,533,214 | 8/1985 | Penz et al. | 350/339 R X |
| 4,586,790 | 5/1986 | Umeda et al. | 350/339 R X |

OTHER PUBLICATIONS

Kondo, K. et al., "A Practical Method of Preparing Thin Homogeneous Ferroelectric Smectic Cells...," *Japanese J. Appld. Phys.*, vol. 22, No. 2, (Feb. 1983), pp. L85–L87.

*Primary Examiner*—Stanley D. Miller
*Assistant Examiner*—Richard F. Gallivan
*Attorney, Agent, or Firm*—Guy W. Shoup

[57] ABSTRACT

A liquid crystal device comprising a liquid crystal cell in which a ferroelectric liquid crystal are put between two sheets transparent substrates each formed with a transparent electrode to the inside thereof with the peripheral edges of the transparent substrates being sealed, a polymer film having a birefringent property appended on one side of the liquid crystal cell and two polarizing plates disposed on both sides of the liquid crystal cell and such that the polarizing directions thereof are in perpendicular to or in parallel with each other. Coloring for the transmission light is suppressed, by which the display quality can be improved.

5 Claims, 2 Drawing Figures

LIQUID CRYSTAL DEVICE HAVING BIREFRINGENT PLATE NEXT TO POLARIZER

BACKGROUND OF THE INVENTION

1. Field of the Invention

This invention concerns a liquid crystal device for use in liquid crystal display devices, liquid crystal light valves, etc.

2. Description of the Prior Art

Technical attention has been attracted in recent years to liquid crystal device using ferroelectric liquid crystals in the field where high speed responsivity is required.

Heretofore, two types of systems have mainly been studied for the display by the use of ferroelectric liquid crystals, that is, a system of birefringent mode display in which a liquid crystal cell is placed between two polarizing plates and optical axes for the liquid crystal molecules are varied by the voltage application for the display and a guest-host mode in which a dichromic pigment is added to the liquid crystal and color-switching is conducted by using a sheet of polarizing plate.

Although the birefringent mode display system has a feature that a high contrast can be obtained by the polarizing plates, the display quality is poor, since there occurs a remarkable coloration due to interferring colors unless the cell gap is restricted to less than 2 μm and, in addition, the hue of the interferring color varies by the scattering of cell gaps making it difficult to obtain uniform display. If the cell gap is reduced to less than 2 μm, although the coloration is less prominent, there are a lot of technical problems in the upon manufacturing a large area panel with such a thin cell gap.

While on the other hand, in the guest-host mode display system, scattering of the cell gap provides no remarkable direct effects on the optical properties as in the birefringent mode cell and the liquid display device can be manufactured with cells having the same extent of gap as in the commercially available TN mode display devices. However, it is difficult to obtain a high contrast and, particularly, a great amount of pigment has to be added for black and white display to bring about problems in the brightness of the display and the life and reliability of the device.

SUMMARY OF THE INVENTION

Accordingly, it is an object of this invention to overcome the foregoing problems in the prior art and provide a liquid crystal device capable of suppressing the coloration caused by the interferring color and capable of attaining a preferred display quality even on a large screen in a birefringent mode display system using ferroelectric liquid crystals.

The foregoing object can be attained in accordance with this invention by a liquid crystal device comprising a liquid crystal cell having ferroelectric liquid crystals put between two transparent substrates each formed with a transparent electrode at the inside thereof with the peripheral portion of the transparent substrates being sealed, a polymer film having a birefringent property appended on one side of the liquid crystal cell and two polarizing plates disposed on both sides of the liquid crystal cell and such that the polarizing directions are in perpendicular with each other.

In accordance with this invention, since the polymer film having the birefringent property is appended on one side of the liquid crystal, the coloration can be suppressed to obtain a preferred display quality even if the size of the cell gap is increased to some extent.

The polymer film of the birefringent property usable in this invention can include, for example, monoaxially stretched polyethylene terephthalate film. The film thickness of the polymer film is preferably from 1 to 100 μm and, more preferably, from 10 to 50 μm. Further, the polymer film is desirably disposed with the optical axis thereof being displaced from the direction in parallel with or in perpendicular to the polarizing axis of one of the polarizing plates by, preferably, from 1° to 20° and, more preferably, from 2° to 7°. This can effectively suppress the coloration.

DESCRIPTION OF THE APPENDED DRAWINGS

These and other objects, features, as well as the advantageous effects of this invention will be made apparent by the description for the preferred embodiments thereof referring to the appended drawings, wherein FIG. 1 is a cross sectional view for a liquid crystal device of a preferred embodiment according to this invention, and FIG. 2 is a chromaticity diagram showing the colored state of the transmission light in the liquid crystal device of the preferred embodiment according to this invention and that of the conventional embodiment.

DESCRIPTION OF THE PREFERRED EMBODIMENTS

Figure 1:
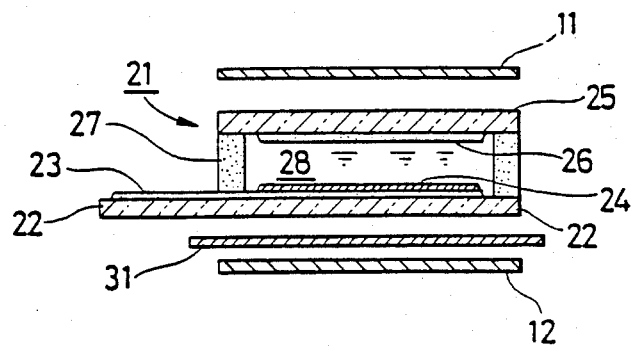

FIG. 1 shows one embodiment for the liquid crystal device according to this invention.

In the liquid crystal device, a monoaxially stretched polymer film 31 is appended on one side of a liquid crystal cell 31 and, further, two polarizing plates 11, 12 are disposed on both sides of the liquid crystal cell 21 with the polarizing directions thereof being in perpendicular to each other. The liquid crystal cell 21 is constituted as described below. A vapor deposition film of indium oxide is formed on a glass substrate 22 on the segment side and patterned into a desired configuration through a photoetching process to form a transparent electrode 23. Further, after coating a 10% solution of a polyimide resin ("PI×1400": trade name of products manufactured by Hitachi Kasei) in N-methylpyrrolidone by using a spinner and removing those portions of the film other than the display area, they are polymerized by crosslinking at 370° C. for one hour to form an oriented film 24. The oriented film 24 is further oriented by rubbing in one direction with absorbent cotton. While on the other hand, a transparent electrode 26 made of a vapor deposition film of indium oxide is formed on a glass substrate 29 on the common side to form a transparent electrode 26, which is then applied with a surface treatment by using a silane coupling agent "SH6020" (manufactured by Toray Silicone Co.). Then, while holding the glass substrate 22 on the segment side and the glass substrate 25 on the common side so as to keep a predetermined gap, the peripheral portions therebetween is secured with a sealant 27 made of an epoxy resin. Then, liquid crystals 28 are sealed to the inside of the liquid crystal of 21. The liquid crystals 28 comprise a mixture of 43.8% by weight of p'-(act-amyloxy)-phenoxy p-n-octyloxy benzoate), 14.2% by weight of p'-(act-amyloxy)-phenoxy p-n-hexyloxy benzoate, 14.2% by weight of p'-(n-octyloxy)phenoxy p-n-octyloxy benzoate, 12.8% by weight of p'-octyloxy phenyl 4-(2-methyl butyl) biphenyl carboxylate, 10% by weight of p'-hexyloxy phenyl 4-(2-methyl butoxy) biphenyl carboxylate and 5% by weight of (−)-4'-octyloxy biphenyl carboxylic acid P-1-methyl heptyl alcohol ester. The liquid crystals exhibit a chiral smectic C phase within a temperature range from 10° to 50° C. and exhibit the value of polarization of the permanent dipole moment of 12.8 nC/cm$^2$ at 15° C.

The liquid crystal cell 21 is disposed between the two polarizing plates 11 and 12 with the polarizing axes thereof being in perpendicular to each other, such that the optical axes of the liquid crystal molecules and the polarizing axis of one of the polarizing plates coincide with each other under the state of applying an electrical field with negative (−) polarity onto the substrate on the segment side to provide a dark state. Then, a polyethylene terephthalate film 31 on about 35 μm thickness stretched monoaxially is inserted with the optical axis thereof being deviated by about 5° relative to the polarizing axis of one of the polarizing plates and the colored state of the interferring transmission light is measured under the bright state applied with an electrical field of positive (+) plarity. Upon measurement, x, y values for the transmission light are measured by using a BM-5 color luminance meter (manufactured by Tokyo Kogaku Co.) As the liquid crystal cell 21, those having two kinds of cell gaps are used. Table 1 shows the results of the comparison between the embodiment according to this invention using the birefringent film 31 and the conventional embodiment without using such film 31.

TABLE 1

|  | Cell gap (um) | Transmission light | |
|---|---|---|---|
|  |  | x value | y value |
| Example 1 | 3.0 | 0.445 | 0.438 |
| Example 2 | 2.1 | 0.395 | 0.423 |
| Comparative Example 1 | 3.0 | 0.491 | 0.448 |
| Comparative Example 2 | 2.1 | 0.419 | 0.435 |

Figure 2:
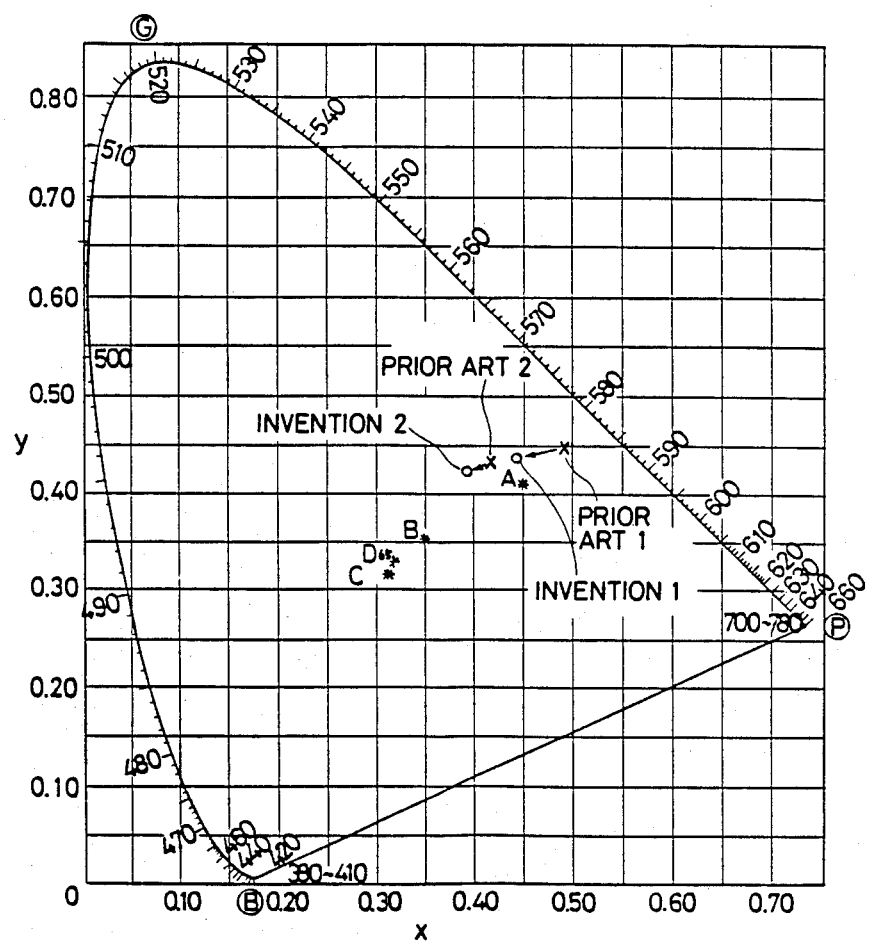

FIG. 2 shows the results of the measurement plotted on the chromaticity diagram. In the figure, a curve with the wavelength graduation shows a spectrum trace, while a straight line connecting both ends of the spectrum trace is a pure-purple trace points A, B, C and D$_{65}$ represent the chromaticity coordinate for the standard light A, B, C and D$_{65}$. Plots with the mark "x" represent the values for the conventional embodiments 1, 2 and plots with the mark "o" represent the values for the embodiments 1 and 2 according to this invention. It can be seen that the values on the chromaticity diagram are displaced toward the center by the insertion of the birefringent polymer film 31 and the colored state of the transmission light is reduced remarkably toward white light.

As has been described above according to this invention, since a pair of polarizing plates are disposed on both sides of the liquid crystal cell and a polymer film with the birefringent property is disposed on one side of the liquid crystal cell, the coloration for the transmission light is suppressed, by which the display quality can further be improved.

What is claimed is:

1. A liquid crystal device comprising a liquid crystal cell in which a ferroelectric liquid crystal is put between two transparent substrates each formed with a transparent electrode to the inside thereof with the peripheral edges of said transparent substrates being sealed, a polymer film having a birefringent property appended on one side of said liquid crystal cell and two sheet polarizing plates disposed on both sides of said liquid crystal cell and such that the polarizing directions thereof are perpendicular to or in parallel with each other.

2. The liquid crystal device as defined in claim 1, wherein the polymer film is disposed such that the optical axis thereof is deviated from the direction in parallel with or perpendicular to the polarizing axis of one of the polarizing plates by preferably from 1° to 20° and, more preferably, from 2° to 7°.

3. The liquid crystal device as defined in claim 1, wherein the film thickness of the polymer film is from 1 to 100 μm.

4. The liquid crystal device as defined in claim 3, wherein the film thickness of the polymer film is from 10 to 50 μm.

5. The liquid crystal device as defined in claim 1, wherein the polymer film is made of a monoaxially stretched polyethylene terephthalate film.

* * * * *